(12) United States Patent
Makita et al.

(10) Patent No.: US 6,930,238 B2
(45) Date of Patent: Aug. 16, 2005

(54) SOLAR CELL MODULE-MOUNTING STRUCTURE AND SOLAR CELL MODULE ARRAY

(75) Inventors: Hidehisa Makita, Kyoto (JP); Akiharu Takabayashi, Nara (JP); Masaaki Matsushita, Nara (JP); Takaaki Mukai, Nara (JP); Shigenori Itoyama, Nara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/658,387

(22) Filed: Sep. 10, 2003

(65) Prior Publication Data

US 2004/0045595 A1 Mar. 11, 2004

Related U.S. Application Data

(63) Continuation of application No. PCT/JP03/03614, filed on Mar. 25, 2003.

(30) Foreign Application Priority Data

Mar. 28, 2002 (JP) .................................. 2002-090187
Mar. 11, 2003 (JP) .................................. 2003-064313

(51) Int. Cl.⁷ .................... H01L 31/042; H01L 31/048
(52) U.S. Cl. .................... 136/251; 136/244; 136/291; 136/293; 136/258; 52/173.3; 257/433
(58) Field of Search .................... 136/251, 244, 136/291, 293, 258; 52/173.3; 257/433

(56) References Cited

U.S. PATENT DOCUMENTS

| | | | | |
|---|---|---|---|---|
| 2,823,245 A | * | 2/1958 | Solow | 136/251 |
| 3,116,171 A | * | 12/1963 | Nielsen et al. | 136/245 |
| 3,769,091 A | * | 10/1973 | Leinkram et al. | 136/246 |
| 4,886,554 A | | 12/1989 | Woodring et al. | 136/244 |
| 5,415,700 A | * | 5/1995 | Arthur et al. | 136/250 |
| 5,505,788 A | * | 4/1996 | Dinwoodie | 136/246 |
| 5,651,837 A | | 7/1997 | Ohtsuka et al. | 136/251 |
| 6,046,399 A | * | 4/2000 | Kapner | 136/244 |
| 6,342,669 B1 | * | 1/2002 | Sakai et al. | 136/244 |
| 6,703,555 B2 | * | 3/2004 | Takabayashi et al. | 136/244 |
| 6,803,515 B2 | * | 10/2004 | Itoyama et al. | 136/251 |
| 6,818,820 B2 | * | 11/2004 | Matsushita et al. | 136/251 |
| 2001/0008143 A1 | | 9/2001 | Sasoaka et al. | 136/244 |
| 2002/0195138 A1 | | 12/2002 | Itoyama et al. | 136/251 |
| 2003/0000566 A1 | | 1/2003 | Matsushita et al. | 136/244 |
| 2003/0075211 A1 | * | 4/2003 | Makita et al. | 136/244 |
| 2004/0000334 A1 | * | 1/2004 | Ressler | 136/251 |
| 2004/0007260 A1 | * | 1/2004 | Dinwoodie | 136/251 |
| 2004/0055894 A1 | * | 3/2004 | Iwasaki et al. | 205/157 |
| 2005/0034753 A1 | * | 2/2005 | Matsushita et al. | 136/251 |

FOREIGN PATENT DOCUMENTS

| | | | |
|---|---|---|---|
| EP | 0 858 115 A2 | | 8/1998 |
| JP | 55-68681 A | * | 5/1980 |
| JP | 62-42469 A | * | 2/1987 |
| JP | 5-57857 A | | 3/1993 |
| JP | 10-212805 | | 8/1998 |

OTHER PUBLICATIONS

U.S. Appl. No. 60/392,341 filed Jun. 27, 2002.*

* cited by examiner

*Primary Examiner*—Alan Diamond
(74) *Attorney, Agent, or Firm*—Fitzpatrick, Cella, Harper and Scinto

(57) ABSTRACT

In a solar cell module-mounting structure, a solar cell module 101 is fixed on one surface of a plate-shaped member 102, the plate-shaped member 102 is placed on an installation surface so that one side of the plate-shaped member is in contact with the installation surface, a surface of the plate-shaped member 102 opposite to the solar cell module-fixing surface is in contact with a first support member 103, and out of surfaces including the one side of the plate-shaped member 102, at least a part of the surfaces in no contact with the first support member 103 is in contact with a second support member 103, thereby effectively preventing a solar cell module-mounting rack from being moved by a wind load.

11 Claims, 14 Drawing Sheets

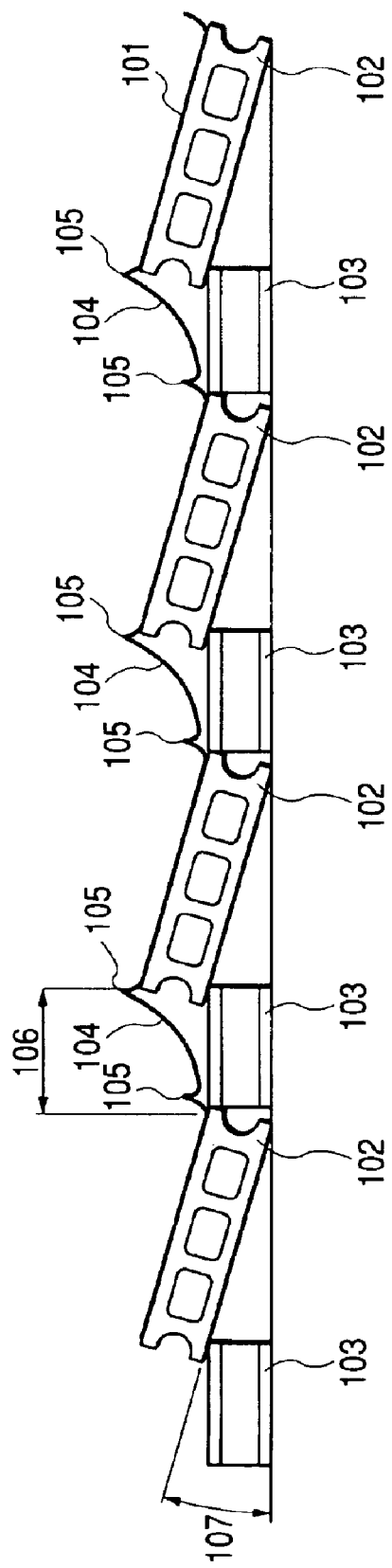

SOLAR CELL MODULE-MOUNTING STRUCTURE AND SOLAR CELL MODULE ARRAY

This application is a continuation of International Application No. PCT/JP03/03614, filed Mar. 25, 2003, which claims the benefit of Japanese Patent Applications No. 2002-090187, filed Mar. 28, 2002 and No. 2003-064313, filed Mar. 11, 2003.

BACKGROUND OF THE INVENTION

1. Field of the Invention

The present invention relates to a solar cell module-mounting structure, a solar cell module array and a photovoltaic power generation system.

2. Related Background Art

The raised awareness of environmental issues has been spreading globally. Particularly, the concern about global warming phenomenon associated with $CO_2$ emission is serious, and the desire for clean energy has been increasing. At present, a solar cell module can be expected as a clean energy source for safety and easy handling.

Recently, various types of forms for mounting the solar cell module other than a roof-mounting type have been proposed as described below.

FIGS. 2A and 2B are schematic views of the solar cell module structure using a conventional rack-mounted-type solar cell module. In FIGS. 2A and 2B, numeral 2001 denotes a solar cell module; 2002 denotes a concrete foundation; 2003 denotes a frame; and 2004 denotes an anchor.

The structure of this type solar cell module is characterized by a structure in which the solar cell module is incorporated into a frame such as an aluminum frame to maintain structural strengths, the front surface of a photovoltaic element is sealed by glass and the bottom surface thereof filled and sealed by plastics to secure sufficient electric insulation properties and weathering resistance, and anchors are hammered into the ground to increase wind pressure resistance strength of the rack itself. The solar cell module of this type has come into widespread use as the most typical one at present.

On the other hand, as a base material for the rack and the solar cell module, a concrete member has been paying attention recently because of its low price.

An example shown in FIG. 3 is known as the one in which a concrete member is used as the rack instead of a conventional frame rack.

FIG. 3 illustrates an example of the rack comprised of a lightweight cellular concrete tailored for a solar cell module described in Japanese Utility Model Laid-Open No. 5-57857. In FIG. 3, numeral 3001 denotes a solar cell module; 3002 denotes a lightweight cellular concrete rack; and 3003 denotes a fastener. According to the construction, a fitting device may be fixed with a nail or the like on the concrete rack, and the rack itself forms an inclined surface for mounting the solar cell module only by placing the rack on the ground, thereby improving workability.

However, not only the conventional rack-mounted solar cell module structure but also the conventional solar cell module-mounting structure using a concrete member as the rack has been limited in cost reduction, because the concrete body has to be prepared as a solar cell module rack having a desired size and an inclination angle.

In view of the above situation, the present inventors have studied the reduction of the material and construction costs of the rack of a solar cell module-mounting structure, and have devised the following structure.

More specifically, a rectangular plate-shaped member is used as a plate-shaped member for supporting the solar cell module, and a support member is used as means for inclining the plate-shaped member for mounting the solar cell module, thus providing the inclination required for mounting the solar cell module to aim to reduce the cost of the materials of the rack and the cost for construction work.

However, in the case of forming the above-described solar cell module-mounting structure, the following problems have become clear.

(Problem of Movement of a Plate-Shaped Member by Wind Pressure)

When a plate-shaped member 403 is installed as shown in FIG. 4, the wind hitting the plate-shaped member 403 in the direction of an arrow 401 generates a force acting in the direction perpendicular to the surface hit by the wind. In other words, a force (lift) lifting the plate-shaped member 403 acts on the fixing-surface 409 of the solar cell module 402 and its opposite surface 405, and a force (drag) moving the plate-shaped member 403 laterally acts on the side surface 404. Generally, these forces are calculated as the product of a wind force coefficient (depending on surface properties and an inclination angle), a wind-receiving area and velocity pressure (proportional to-the square of wind velocity), and the lift and the drag acting on each plate-shaped member increase in proportion to the square of the wind velocity.

Further, when the plate-shaped member 403 is in contact with an installation surface 407 and a support member 406 at one side respectively to be supported as shown in FIG. 4, the area of contact between the installation surface 407 and the plate-shaped member 403 and the area of contact between the support member 406 and the plate-shaped member 403 are small, thereby resulting in a small frictional force between the plate-shaped member 403 and the installation surface 407. When a force as illustrated in FIG. 4 acts in such a state, the frictional force between the plate-shaped member and the installation surface is further decreased due to the decrease of its own weight by the lift, thereby causing the plate-shaped member to be moved laterally even by a wind having a strength smaller than the wind pressure resistance strength of the plate-shaped member.

SUMMARY OF THE INVENTION

The present invention provides a solar cell module-mounting structure capable of effectively preventing a solar cell module-mounting rack from being moved by a wind load; and a solar cell module array and a photovoltaic power generation system utilizing the structure.

The inventors have diligently conducted research and development and found that the following solar cell module-mounting structure is the best.

More specifically, the solar cell module-mounting structure according to the present invention is characterized by comprising: a plate-shaped member having a solar cell module fixed on one surface thereof, a first support member, and a second support member, wherein the plate-shaped member is placed on an installation surface so that one side of the plate-shaped member is in contact with the installation surface, a surface of the plate-shaped member opposite to the solar cell module-fixing surface is in contact with the first support member, and out of surfaces including the one side of the plate-shaped member, at least a part of the surfaces in no contact with the first support member is in contact with the second support member.

The solar cell module-mounting structure according to the present invention is further characterized in that:

"the above-described second support member is a support member which is in contact with a surface of a second plate-shaped member opposite to a solar cell module-fixing surface of the second plate-shaped member to support the second plate-shaped member";

"the above-described plate-shaped member is cast from a concrete material";

"the above-described plate-shaped member and the above-described support member have the same shape and are made of the same material";

"the above-described solar cell module is fixed to the above-described plate-shaped member with an adhesive";

"the above-described adhesive is an elastic adhesive";

"the above-described adhesive is provided at the surrounding part of the above-described solar cell module";

"the above-described solar cell module is composed of amorphous silicon formed on a stainless steel substrate"; and "an insulating member is placed between the above-described one side of the plate-shaped member to be brought into contact with the above-described installation surface and the above-described installation surface".

In addition, the present invention provides a solar cell module array comprising the solar cell module-mounting structure according to the present invention, and further a photovoltaic power generation system comprising the solar cell module array and a power conditioner.

The present invention can effectively prevent lateral movement of a plate-shaped member by a wind load to prevent the break of a wire and the like caused by such lateral movement.

Further, use of a concrete member for the plate-shaped member can suppress cost increase of the rack as much as possible, and in particular use of lightweight hollow concrete can improve installation workability and easiness of construction, resulting in cost reduction.

In addition, the plate-shaped member can be abutted against a support member to be placed on an installation surface. Therefore, when only a support member and a plate-shaped member to be installed first are positioned properly, subsequent installation can be performed only by abutting another plate-shaped member against the support member, allowing the time for a cumbersome positioning work to be shortened.

Furthermore, use of an adhesive for fixing the solar cell module on the surface of the plate-shaped member eliminates concern for stripping of the solar cell module by a wind load. In particular, use of an elastic adhesive or a double-sided tape with elasticity for fixing the solar cell module allows the adhesive layer to absorb difference in the coefficient of thermal expansion between the solar cell module and the plate-shaped member, resulting in the improvement of reliability. In addition, the solar cell module is fixed to the plate-shaped member at a surrounding part (circumferential edge) thereof, thereby allowing easy replacement of the solar cell module.

In addition, placement of an insulating member between one side of the plate-shaped member to be brought into contact with an installation surface and the installation surface can further reduce the leak current from a solar cell module having a partly exposed cable way or a wire having no insulation coating.

BRIEF DESCRIPTION OF DRAWINGS

FIG. 1 is a schematic view showing a solar cell module-mounting structure according to an embodiment of the present invention;

DESCRIPTION OF THE PREFERRED EMBODIMENTS

An embodiment of the present invention will now be described below referring to FIG. 1. The present invention is not limited to this embodiment.

FIG. 1 is a schematic side view for illustrating the solar cell module-mounting structure according to the present invention. In FIG. 1, numeral 101 denotes a solar cell module; 102 denotes a plate-shape member; 103 denotes a support member; 104 denotes a connection cable; 105 denotes a connection member (ring sleeve); 106 denotes the distance between racks; and 107 denotes the inclination angle of the plate-shaped member.

As shown in FIG. 1, the solar cell module 101 is fixed on the upper surface of the plate-shaped member 102. Further, the plate-shaped member 102 is installed in contact with an installation surface (such as the ground) and with the support member 103 at one side thereof, respectively. The upper solar cell module-fixing surface of the plate-shaped member 102 in a certain row is in contact with the support member 103 in the next adjacent row.

Each member for constituting the solar cell module-mounting structure according to the present invention will now be described below.

[Solar Cell Module]

Preferably, the solar cell module for use in the present invention is a thin and lightweight type. Crystals such as single-crystal silicon and polycrystalline silicon, amorphous silicon, compound semiconductors such as CIGS and CIS, and the like can be used for the photovoltaic layer of the solar cell module.

As a suitable example of the solar cell module, for example, the photovoltaic element composed of amorphous silicon formed on a stainless steel substrate can be used. This construction is very convenient for manufacturing a thin and lightweight solar cell module. The flexible construction also allows sticking and fixing, for example, even on the curved surface of a rack.

Referring to FIGS. 6A, 6B, 7A and 7B, the solar cell module using the photovoltaic element composed of amorphous silicon formed on a stainless steel substrate will now be described.

Figure 6A:
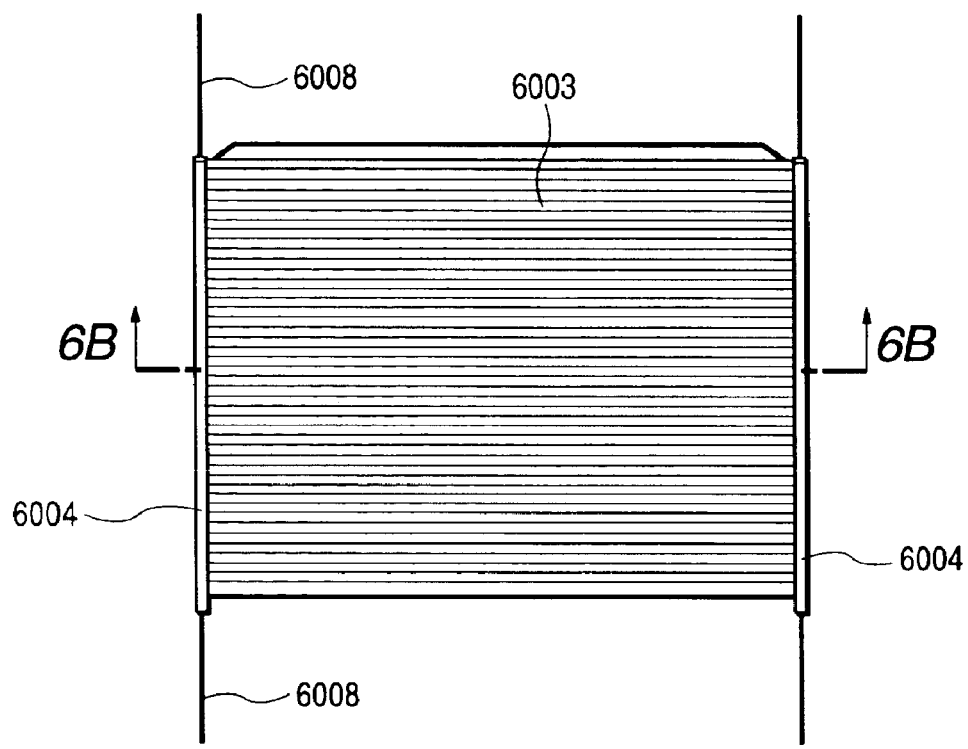
FIG. 6A is a plan view showing an example of the solar cell module for use in the present invention.
Figure 6B:
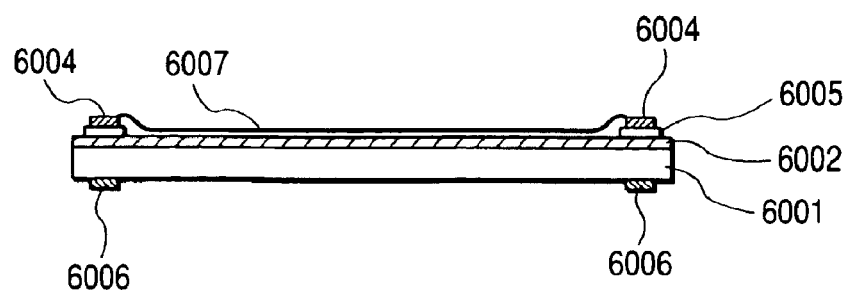
FIG. 6B is a cross-sectional view taken in the line 6B—6B of FIG. 6A.
Figure 7A:
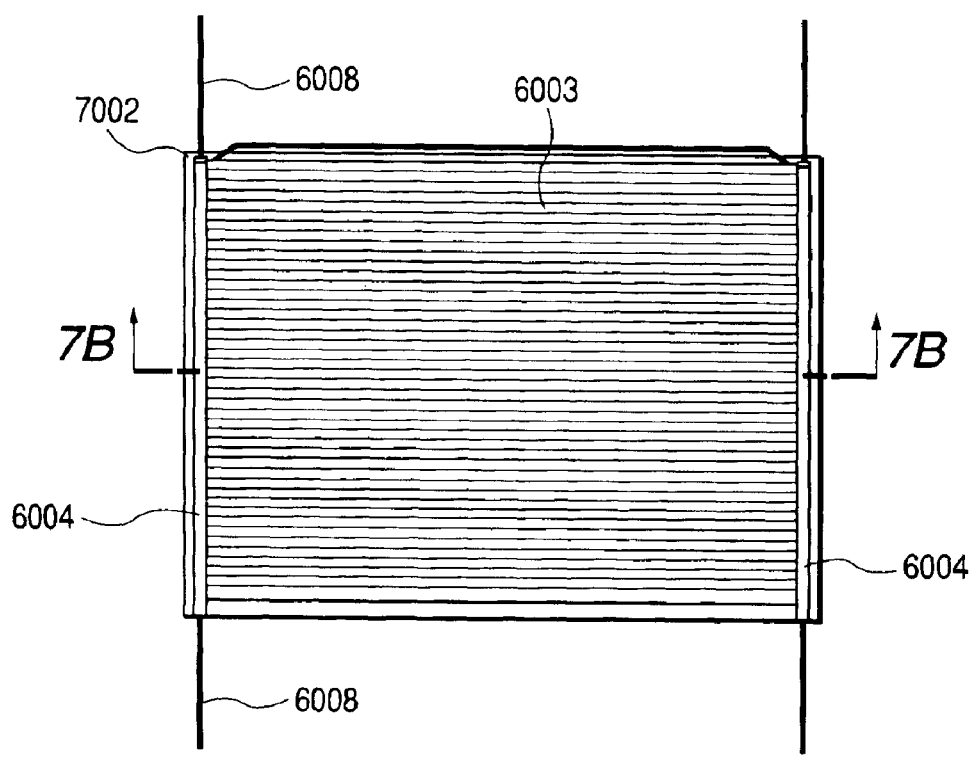
FIG. 7A is a plan view showing an example of the solar cell module for use in the present invention.
Figure 7B:
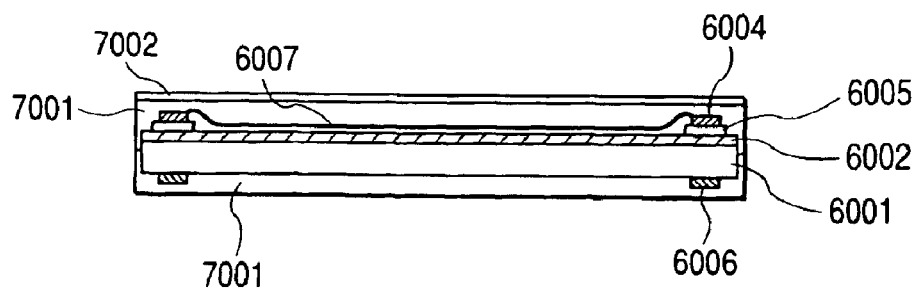
FIG. 7B is a cross-sectional view taken in the line 7B—7B of FIG. 7A.

FIG. 6A is a plan view of the photovoltaic element, and FIG. 6B is a sectional view taken in the line 6B—6B of FIG. 6A. FIGS. 7A and 7B are examples showing the state in which the light-receiving surface and the back surface of the photovoltaic element of FIGS. 6A and 6B are resin-sealed. FIG. 7A is a view from the light-receiving surface side, and FIG. 7B is a sectional view taken in the line 7B—7B of FIG. 7A.

In FIGS. 6A, 6B, 7A and 7B, numeral 6001 denotes a stainless steel substrate; 6002 denotes a semiconductor photoactive layer; 6003 denotes a collecting electrode; 6004 denotes a positive electrode copper tab; 6005 denotes an insulating double-sided tape; 6006 denotes a negative electrode copper tab; 6007 denotes a weatherproof coating; 6008 denotes a bare copper solid wire; 7001 denotes an EVA resin; and 7002 denotes an ETFE resin.

The solar cell module as shown in FIGS. 6A, 6B, 7A and 7B can be manufactured, for example, as described below.

An Al layer and a ZnO layer are first formed successively on a cleaned stainless steel substrate 6001 by sputtering process as a metal electrode layer (or a light-reflecting layer) for the back surface side of the solar cell module. A semiconductor layer of amorphous silicon (a-Si) is then formed by a plasma CVD process. Next, as a transparent conductive layer, $In_2O_3$ thin film is deposited by a resistance heating process to form a semiconductor photoactive layer 6002. A silver paste is then formed by screen printing or the like to form a collecting electrode 6003.

Further, the collecting electrode 6003 is connected to the positive electrode copper tabs 6004 on both sides of the stainless steel substrate. The positive electrode copper tabs are fixed to the stainless steel substrate with an insulating double-sided tape 6005, and the negative electrode copper tabs 6006 on the back side are laser-welded to the stainless steel substrate. The weatherproof coating 6007 is applied only on the light-receiving surface side.

Next, the bare copper solid wire 6008 for series connection of the solar cell modules is processed to substantial U shape to be electrically connected with the positive electrode tabs 6004 and the negative electrode tabs 6006.

Lastly, as shown in FIGS. 7A and 7B, a stacked member of the ETFE resin 7002 and the EVA resin 7001 is laminated on the light-receiving surface side, and the EVA resin 7001 on the non-light-receiving surface is laminated with a vacuum laminator.

When a plurality of the solar cell module-mounting structures according to the present invention are used to systemize the structure, the solar cell modules are connected in series to form a series structure in advance, thereby decreasing the connection work in the installation field to enable cost reduction.

The solar cell module according to the present invention is not limited to the above-described solar cell module, but may include a conventional solar cell module with a frame having a glass surface member.

[Plate-Shaped Member]

Any plate-shaped member capable of mounting electrical parts thereon, having a certain thickness and structural strengths may basically be used for the plate-shaped member.

Figure 8A:
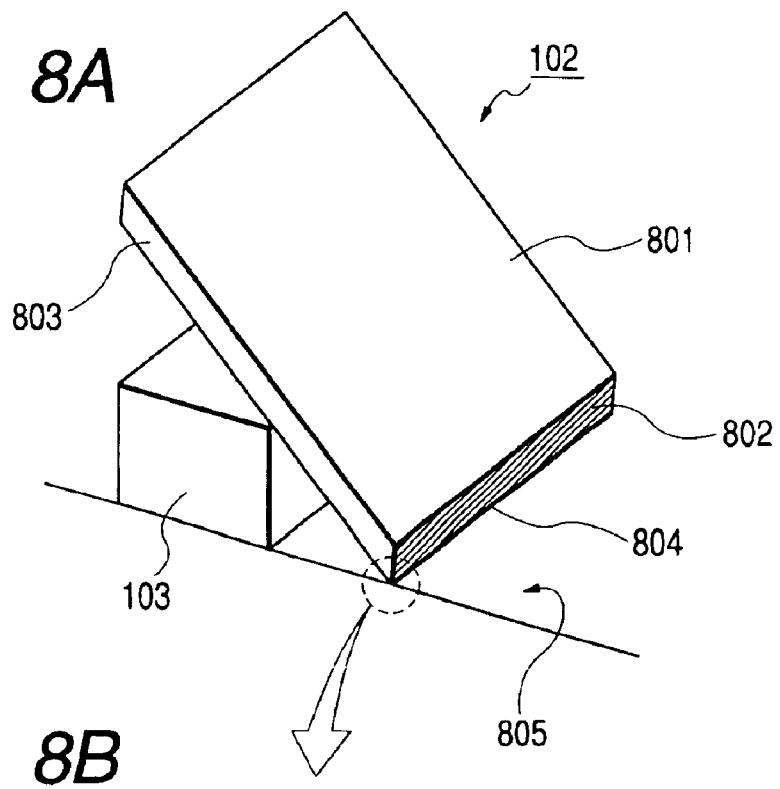
FIGS. 8A, 8B and 8C are conceptual diagrams of the plate-shaped member for use in the present invention, and partial expanded views thereof.
Figure 8B:
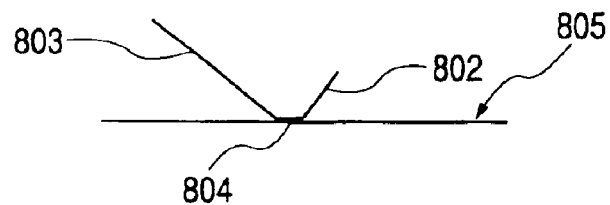
Figure 8C:
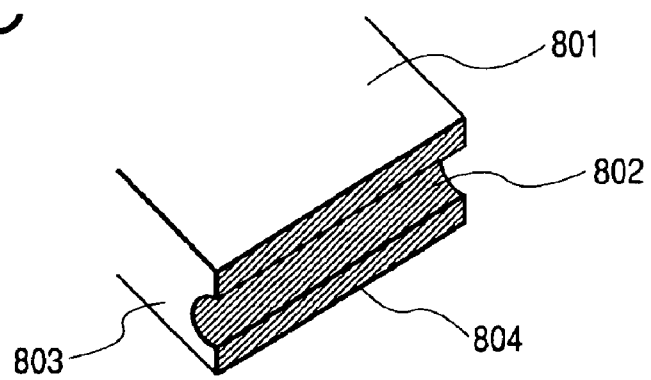

FIGS. 8A to 8C show conceptual diagrams of the plate-shaped member. FIG. 8A is a perspective view showing the state in which the plate-shaped member 102 is installed in contact with a plate-shaped member-installing surface 805 and with a support member 103 at one side thereof, respectively. FIG. 8B is a schematic expanded view showing a contact part of the plate-shaped member 102 with the plate-shaped member-installing surface 805. FIG. 8C is a perspective view showing an example of the shape of a surface 802 of the plate-shaped member which includes the one side in contact with the plate-shaped member-installing surface 805 and which is not abutted against a support member 103. In FIG. 8C, numeral 801 denotes a solar cell module-fixing surface of the plate-shaped member 102; 803 denotes an opposite surface of the plate-shaped member to the solar cell module-fixing surface 801, the opposite surface being abutted against the support member 103; 804 denotes the one side of the plate-shaped member which is brought into contact with the plate-shaped member-installing surface 805; and 802 denotes a surface containing the one side edge 804 and is not abutted against the support member 103.

The side 804 where the plate-shaped member-installing surface 805 is in contact with the plate-shaped member 102 typically has a certain width as shown in FIG. 8B.

Further, the surface 802 which includes the above-described one side 804 and is not abutted against the support member 103 is the surface of the diagonally shaded area shown in FIG. 8C, which may have a structure having a surface with a recess as illustrated or a structure having any uneven shape.

As a material for the plate-shaped member 102, a concrete member is easy in handling and useful in terms of cost, structural strength and weight. When the concrete member is used, it may be formed at the installation field by assembling a mold, pouring a concrete to the mold and hardening the concrete, but it is preferable that a concrete member previously molded in a plant is conveyed into the installation field, because in the field work, hardening conditions may change depending on season, weather, a curing method and the like.

Generally, when the scale of electric power generation for a photovoltaic power generation system is determined, the size of a solar cell module-mounting structure is determined. Therefore, it is convenient that the concrete rack (plate-shaped member) is previously molded in the plant in terms of mass production. Further, when conveyed into the installation field, the plate shape gives good workability and high handling efficiency.

Figure 9A:
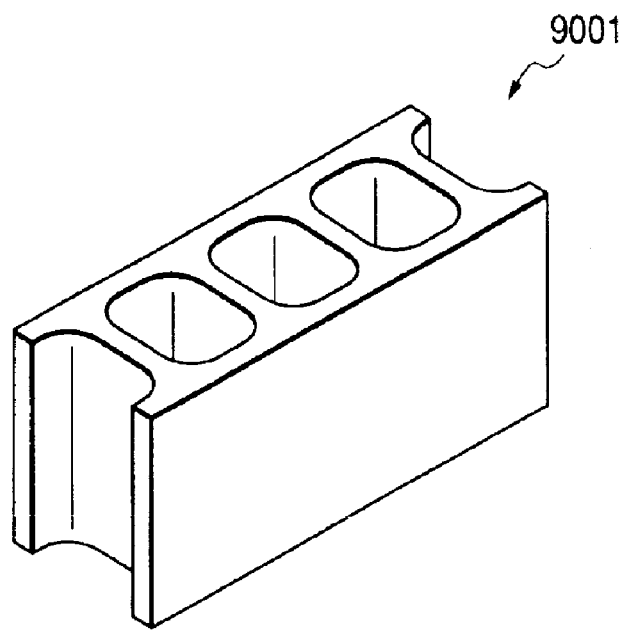
FIGS. 9A and 9B are schematic views showing an example of the concrete member suitable for use in the present invention.
Figure 9B:
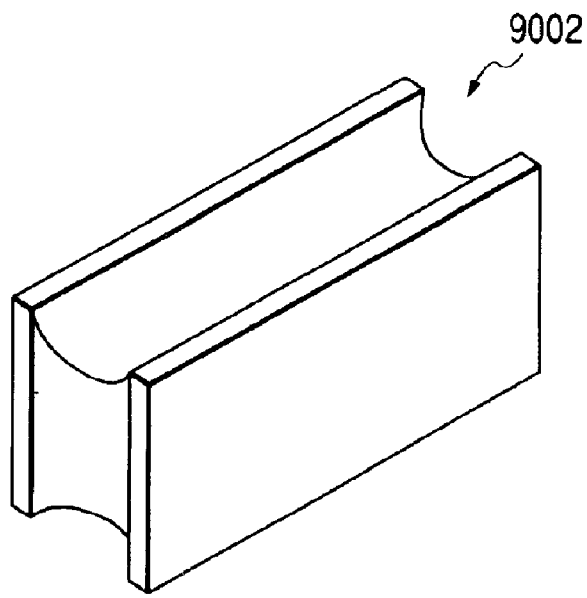

A hollow concrete 9001 shown in FIG. 9A and a horizontal reinforcement concrete 9002 shown in FIG. 9B are very useful in terms of a low price, reduced weight and high strength.

More specifically, the hollow concrete member among the construction concrete blocks provided in JISA5406 and the like is particularly preferred in terms of cost as a plate-shaped member, strength of the plate-shaped member itself, easiness of handling and the like.

(Hollow Concrete)

Concrete can be used for a structure by kneading cement, coarse aggregate, fine aggregate and water, casting them into a mold and hardening them. Portland cement, which is generally most frequently used, is composed of clinker ($C_3S$ (alite), $C_2S$ (belite), $C_3A$ (aluminate phase), $C_4AF$ (ferrite phase), $CaS_4.2H_2O$ (gypsum dihydrate)), to which the coarse aggregate (gravel), the fine aggregate (sand) and water are added to start hydration reaction to form a hydration product (a calcium silicate hydrate (C-S-H)), calcium hydroxide and the like to bind the cement particles and the aggregate with each other to solidify. The above-described symbol C denotes CaO; S denotes $SiO_2$; A denotes $Al_2O_3$; F denotes $Fe_2O_3$; and H denotes $H_2O$.)

The aggregate includes a natural aggregate (river sand, sea sand, mountain sand and the like) and an artificial aggregate.

[Support Member]

The support member 103 is a member used for inclining the surface for placing a solar cell module (solar cell module-fixing surface 801) of the plate-shaped member 102 and abuts against the surface 803 opposite to the solar cell module-fixing surface 801.

An inexpensive and high-strength one such as a concrete block is suitably used for the support member 103. Also, use of the same member as the plate-shaped member 102 can reduce construction and material costs.

[Adhesive]

An adhesive is used for fixing a solar cell module on a plate-shaped member. The required quality includes weathering resistance, water resistance, resistance to alkalis, light resistance, elasticity, electrical insulating properties and the like. As materials, an epoxy-based adhesive and a silicone-based adhesive and the like can be used.

When a solar cell module is bonded and fixed to a plate-shaped member, the adhesive is advantageously placed at the surrounding part of the solar cell module, because when the solar cell module is to be replaced in future, the solar cell module can be removed relatively easily by cutting the adhesion part using a cutter knife from the outside.

[Connection Cable]

The diameter of a connection cable is selected by the size of the current to a solar cell module. For the material, copper is generally preferred.

Any connection cable with or without an insulation coating is useful.

[Distance between Racks]

The distance between racks (the distance shown by numeral 106 in FIG. 1) is determined in consideration of the loss of the generated energy of a solar cell module caused by the shadow of the plate-shaped member 102. The distance is generally set so that the loss of the generated energy is below 1%. The larger inclination angle (the angle shown by numeral 107 in FIG. 1) of the plate-shaped member makes the larger shadow of the plate-shaped member 102 which covers the next row. This is avoided by increasing a distance between racks. The length or the direction of the support member 103 for inclining the plate-shaped member 102 is changed to place the plate-shaped member and the support member so that the rack has a calculated length or more.

Figure 2A:
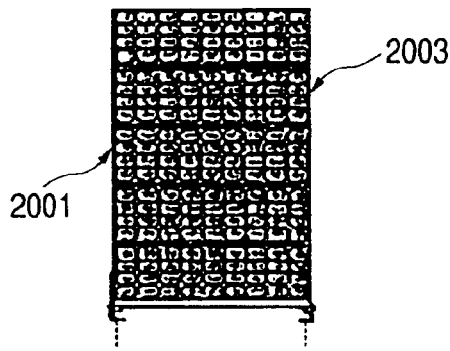
FIGS. 2A and 2B are schematic views of a conventional mounting structure with a rack-mounted photovoltaic element.
Figure 2B:
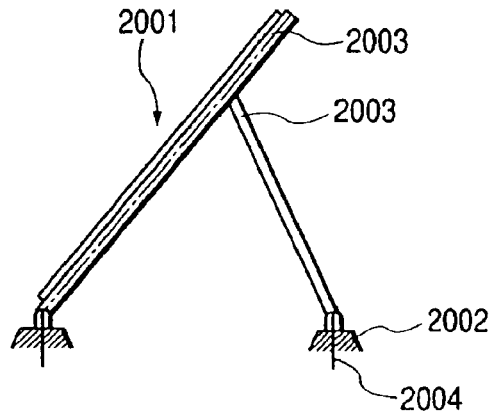
Figure 3:
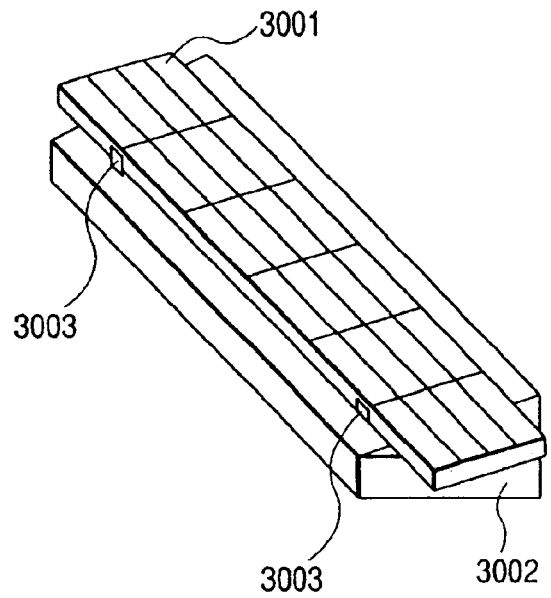
FIG. 3 is a schematic view of a conventional concrete rack tailored for a solar cell module.
Figure 4:
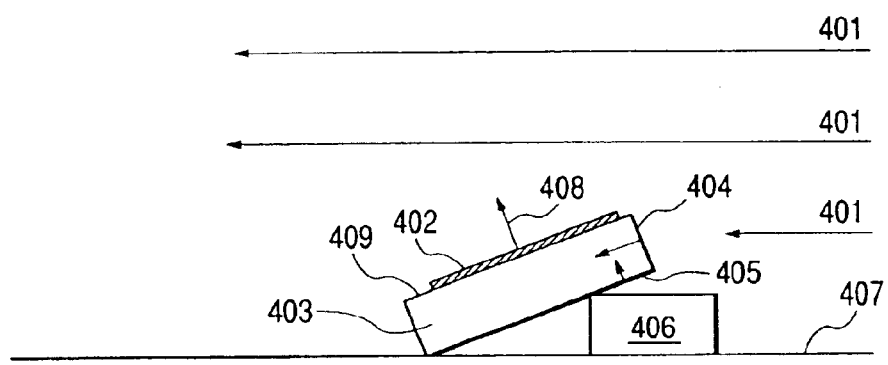
FIG. 4 is a conceptual diagram for explaining a wind load acting on a plate-shaped member.
Figure 5:
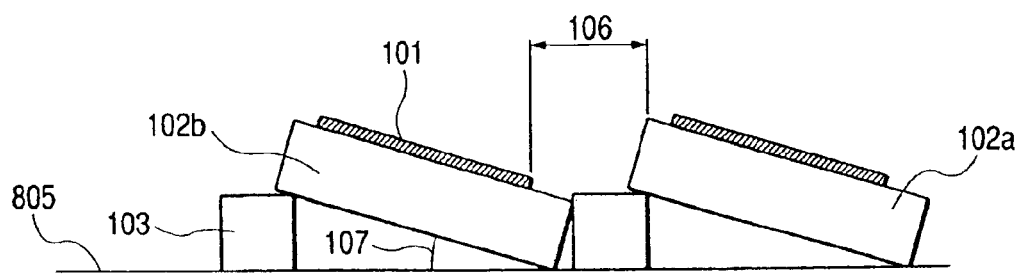
FIG. 5 is a view illustrating a distance between racks.

The distance between racks according to the present invention will be described referring to FIG. 5. The distance between racks 106 is defined as the distance between the uppermost part of the plate-shaped member 102a in a certain row and the lowermost end of the solar cell module 101 adhered to the plate-shaped member 102b in the adjacent row.

The present invention will now be described in detail below based on the following examples.

EXAMPLE 1

Figure 10:
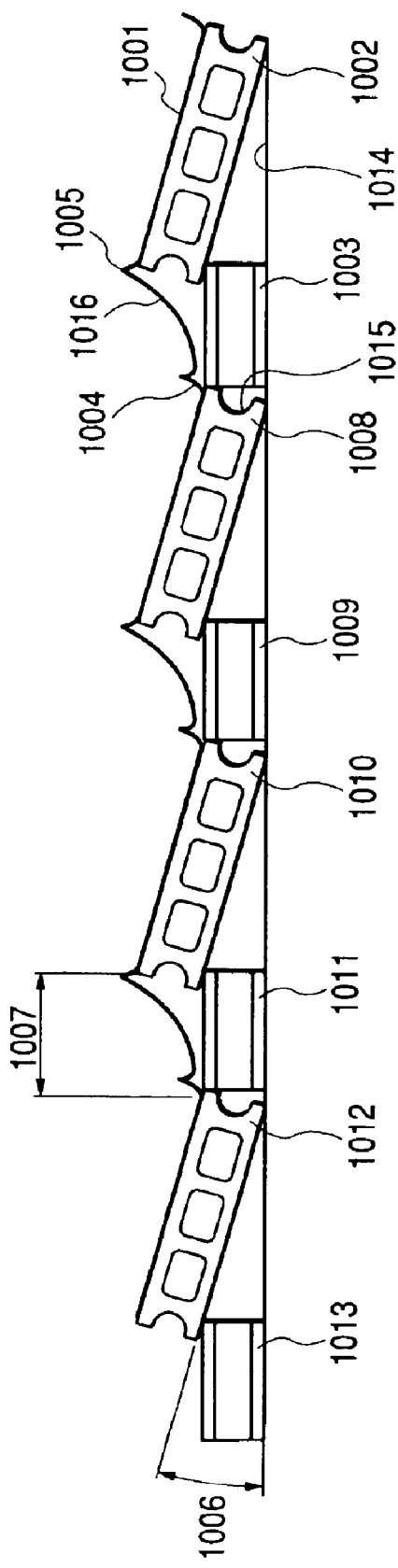
FIG. 10 is a side view schematically showing a part of the solar cell module-mounting structure of Example 1.
Figure 11:
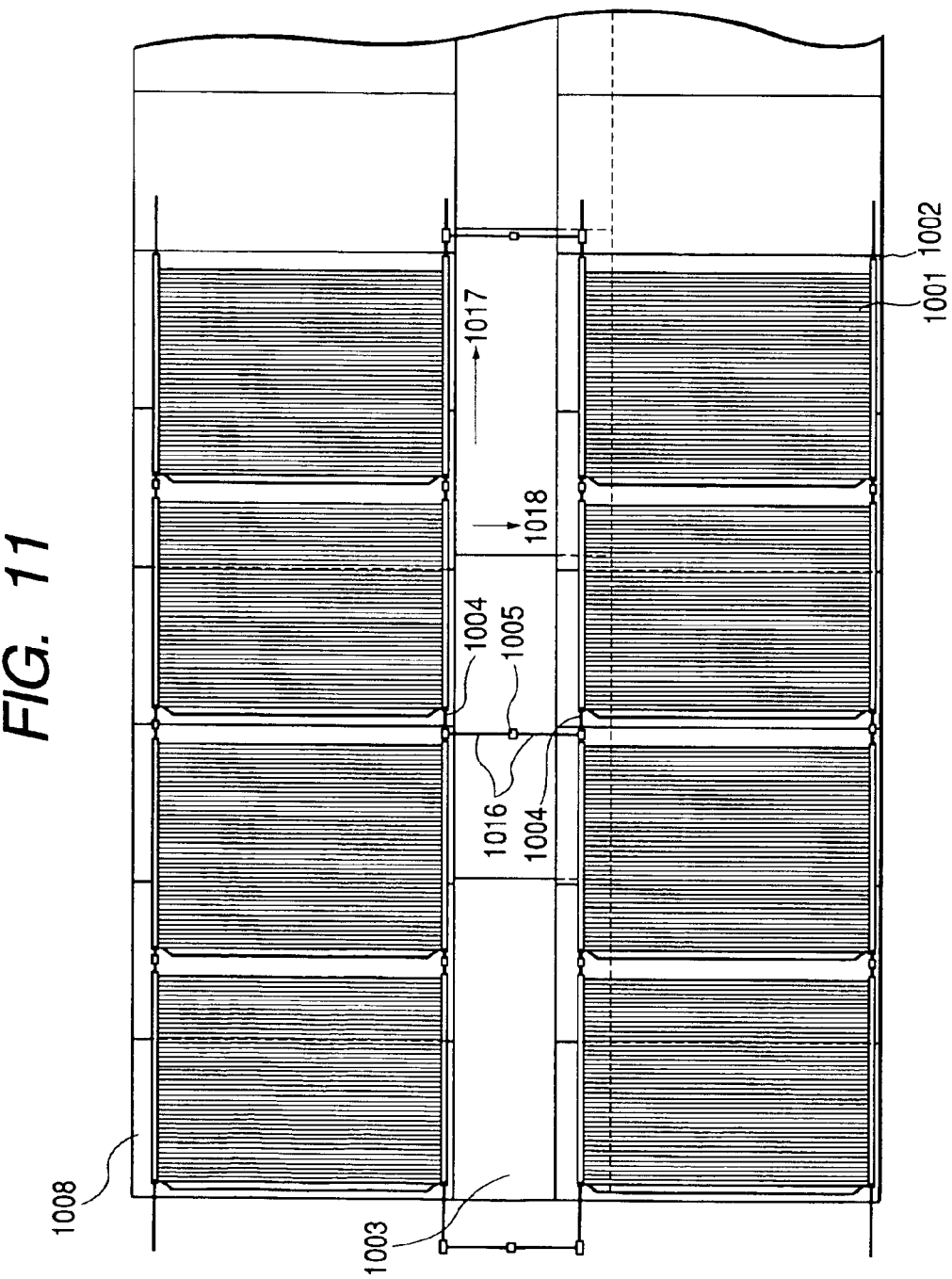
FIG. 11 is a plan view schematically showing a part of the solar cell module-mounting structure of Example 1.

FIGS. 10 and 11 are schematic views for illustrating the solar cell module-mounting structure according to the present example. FIG. 10 is a view of the mounting structure when viewed from the side. FIG. 11 is a view of a part of the mounting structure when viewed from the light-receiving surface side of the solar cell module.

In FIGS. 10 and 11, numeral 1001 denotes a solar cell module; 1002 denotes a first row plate-shaped member; 1003 denotes a first row support member; 1008 denotes a second row plate-shaped member; 1009 denotes a second row support member; 1010 denotes a third row plate-shaped member; 1011 denotes a third row support member; 1012 denotes a fourth row plate-shaped member; 1013 denotes a fourth row support member; 1004 denotes a connection cable; 1005 denotes a ring sleeve; 1006 denotes the inclination angle of a plate-shaped member; 1007 denotes the distance between racks; 1016 denotes a parallel connection cable; 1017 denotes the direction of the series connection of solar cell modules; and 1018 denotes the direction of the parallel connection of solar cell modules.

Each member for constituting the solar cell module-mounting structure according to the present example will now be described in detail below.

(Solar Cell Module)

Figure 12A:
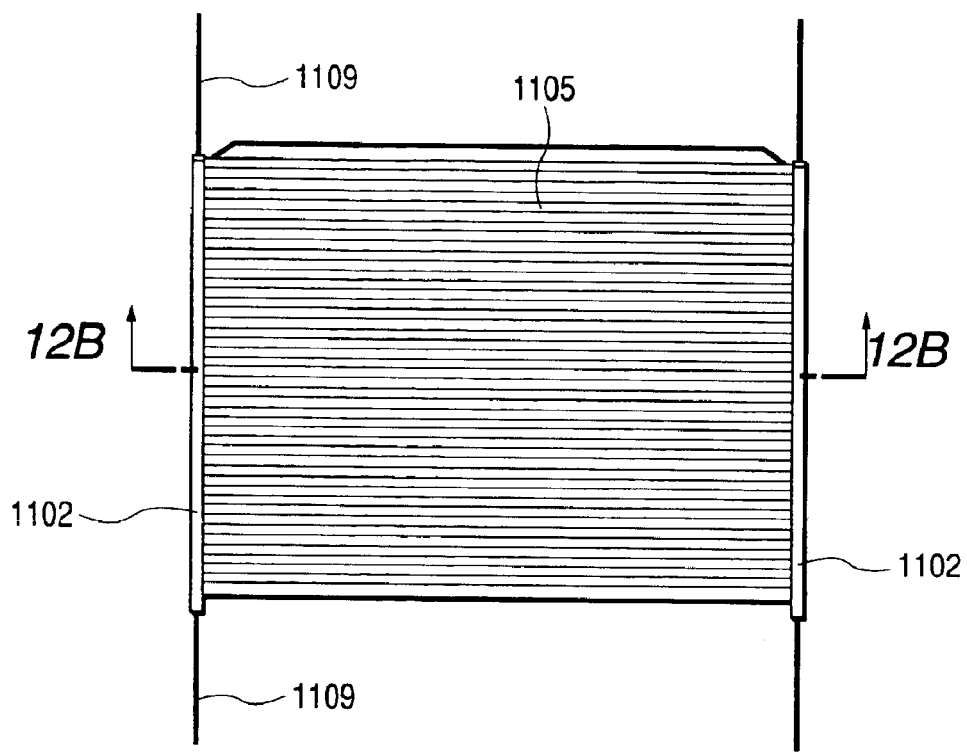
FIG. 12A is a schematic plan view of the solar cell module used in the solar cell module-mounting structure of Example 1.
Figure 12B:
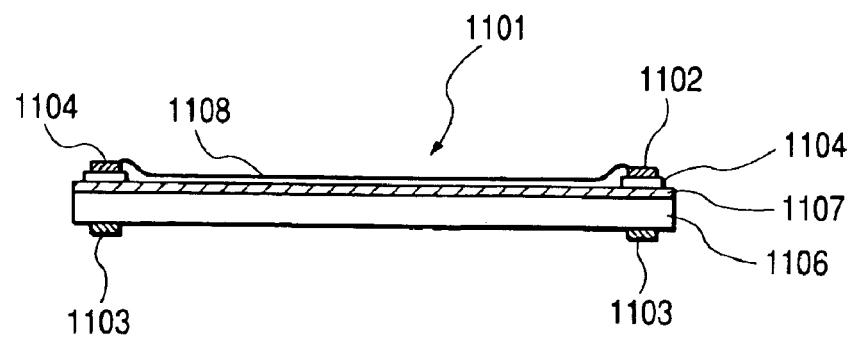
FIG. 12B is a cross-sectional view taken in the line 12B—12B of FIG. 12A.

FIGS. 12A and 12B are schematic views of the solar cell module for use in the present example. FIG. 12A is a plan view of the solar cell module, and FIG. 12B is a sectional view taken in the line 12B—12B of FIG. 12A.

A solar cell module 1101 has a semiconductor photoactive layer 1107 formed on a metal substrate 1106, which is also a back electrode, and a collecting electrode 1105 for collecting the current generated in the semiconductor photoactive layer 1107 is disposed on the side of a light-receiving surface. A stainless steel having a thickness of 0.15 mm is herein used for the metal substrate 1106; tandem construction consisting of amorphous silicon and microcrystalline silicon is used for the semiconductor photoactive layer 1107; and for the collecting electrode 1105, a copper wire of 100 $\mu m\phi$ is fixed on the semiconductor photoactive layer 1107 with a conductive paste.

Further, the collecting electrode 1105 is connected to a copper positive electrode tab 1102 of 100 $\mu m$ thick. In addition, a polyester insulating member 1104 is disposed to insure the insulation between the positive electrode tab 1102 and the metal substrate 1106.

Furthermore, for providing weather resistance, an acryl-silicone weatherproof coating 1108 is formed on the collecting electrode 1105 to manufacture the solar cell module.

Finally, for carrying out a series-parallel work for the solar cell module easily in the field, a bare copper solid wire 1109 of $\phi 1.6$ mm is processed to a generally U shape to be electrically connected with the positive electrode tabs 1102 and the negative electrode tabs 1103 by unleaded solder in advance.

The solar cell module of the present example comprises the metal substrate 1106 having a dimension of 240 mm×360 mm. Further, the present solar cell module has 9.21 A as Ipm (a current value at the maximum output of the solar cell module).

(Plate-Shaped Member, Support Member)

A hollow concrete block of 390 mm×190 mm×100 mm thick and C-class provided in JISA5406 architectural concrete block was used for a plate-shaped member and a support member.

(Construction Method)

The procedure for manufacturing the solar cell module-mounting structure according to the present example using the above-described materials will now be described.

(Determination of the Series-Parallel Numbers of the Solar Cell Modules)

In the present example, 40 solar cell modules were connected in series, and four sets of the 40-series-connected solar cell modules were connected in parallel to prepare one solar cell module-mounting structure aggregate. As shown in FIG. 11, since three plate-shaped members are used for two solar cell modules, the number of the plate-shaped members required was 240 from the calculation as follows: 40 in series÷2×3=60, which 60 are required for four parallel rows. Further, 116 pieces of the support members similar to the plate-shaped member were used and installed in a direction of intersecting the direction of the plate-shaped members at 90 degrees, as shown in FIG. 10.

(Determination of the Inclination Angle of the Plate-Shaped Member, Positioning and Arrangement (Method for Applying an Adhesive))

In the present example, the inclination angle of the plate-shaped member was set at 16°. The point at 34.74° north latitude and 135.8° east longitude was selected for the location of the installation. The distance between racks, in which the loss of the generated energy of a solar cell module array relative to the annual generated energy is below 1%, was calculated to be 160 mm from the annual solar radiation data of the location. The distance between racks of the present example (the distance shown by numeral 1007 in FIG. 10) is about 212 mm, thus a sufficient distance between racks being maintained. The sequence of the installation is described using FIGS. 10 and 11.

First, the first row support member 1003 is placed on a predetermined location of the ground 1014. Next, the first row plate-shaped member 1002 is placed abutting against the first row support member 1003, and installed so that a solar cell module-fixing surface has 16° as measured by a gradient meter.

Next, the second row plate-shaped member 1008 and the second row support member 1009 are installed. The support member 1009 is first placed under the plate-shaped member 1008 such that the upper part of the surface 1015 of the second row plate-shaped member 1008, which includes the side in contact with the ground 1014 but is not abutted against the support member 1009 is brought into contact with the first row support member 1003. Then, the adjustment is made by a gradient meter so that the second row plate-shaped member 1008 is in contact with the first row support member 1003 and the second row plate-shaped member 1008 has an inclination angle of 16°.

Similarly, the third row plate-shaped member 1010, the third row support member 1011, the fourth row plate-shaped member 1012, and the fourth row support member 1013 are installed in this sequence.

Next, required numbers of racks were installed in the direction of the depth of the paper in FIG. 10 along the racks (the plate-shaped member and the support member) which had been first installed. Workability is very good, because the installation may be carried out by just following the plate-shaped member already installed in the first row with a desired inclination angle.

The support member and the plate-shaped member are installed in contact with each other, so that no mark or line is needed on the ground or the like (only needed for the first installation), which further improves the workability.

(Sticking of a Solar Cell Module, a Sticking Position and the Sequence for Sticking)

Next, a solar cell module was stuck on an installed plate-shaped member with an elastic adhesive. The adhesive was not applied on the whole back surface metal substrate of the solar cell module, but its suitable amount was applied on five points including four corners and the center of the back surface metal substrate, and pressed to be stuck to the plate-shaped member.

The sticking position of the solar cell module was selected so that the solar cell module is positioned at the center of the plate-shaped member when mounted, as shown in FIGS. 10 and 11.

(Series-Parallel Connection Work between Solar Cell Modules)

Next, the series-parallel connection work between solar cell modules will be described referring to FIG. 11. As shown in FIG. 11, the copper solid wires of $\phi$1.6 mm, which are soldered to the positive electrode tabs and the negative electrode tabs of the solar cell module, are crimped with a ring sleeve 1005 in a direction of series connection (in a direction of an arrow 1017 in FIG. 11) by using a tailored press-bonding tool to complete the series work.

One bypass diode was connected in parallel for two series of a solar cell module parallel group. The bypass diode having the rating of 100 A was selected for connection in consideration of the maximum current calculated as follows: maximum 9.21×4 in parallel=36.84 A.

For connecting as described above, one parallel connection cable 1016 for two series of solar cell modules of a solar cell module parallel group was connected with the cable 1016 of the next row solar cell module parallel group with a ring sleeve 1005.

EXAMPLE 2

In the present example, the inclination angle of a plate-shaped member, the distance between racks (direction of a support member) and the construction of a solar cell module were changed from the solar cell module-mounting structure of Example 1.

Figure 13:
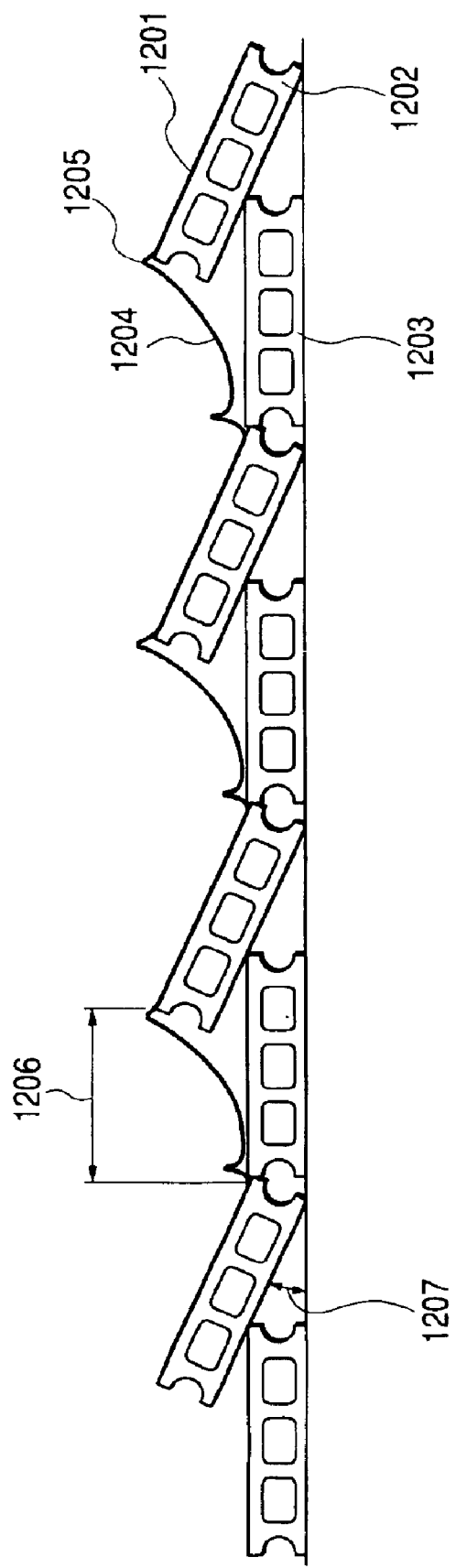
FIG. 13 is a side view schematically showing a part of the solar cell module-mounting structure of Example 2.

FIG. 13 is a side view of the solar cell module-mounting structure of the present example. In FIG. 13, numeral 1201 denotes a solar cell module; 1202 denotes a plate-shaped member; 1203 denotes a support member; 1204 denotes a connection cable; 1205 denotes a connection member (ring sleeve); 1206 denotes the distance between racks; and 1207 denotes the inclination angle of the plate-shaped member.

(Solar Cell Module)

Figure 14A:
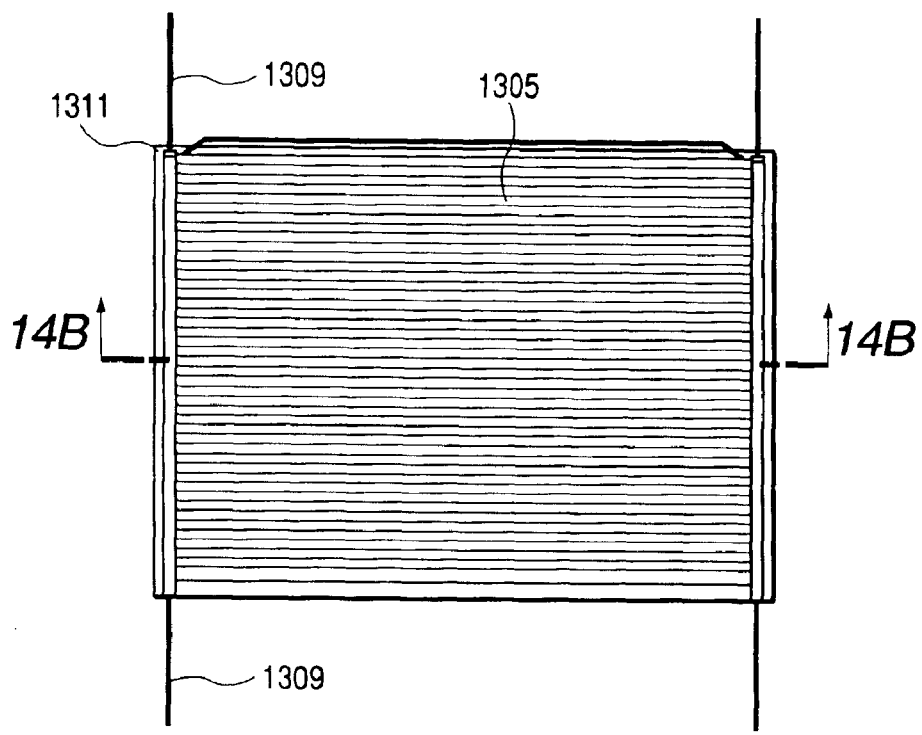
FIG. 14A is a schematic plan view of the solar cell module used in the solar cell module-mounting structure of Example 2.
Figure 14B:
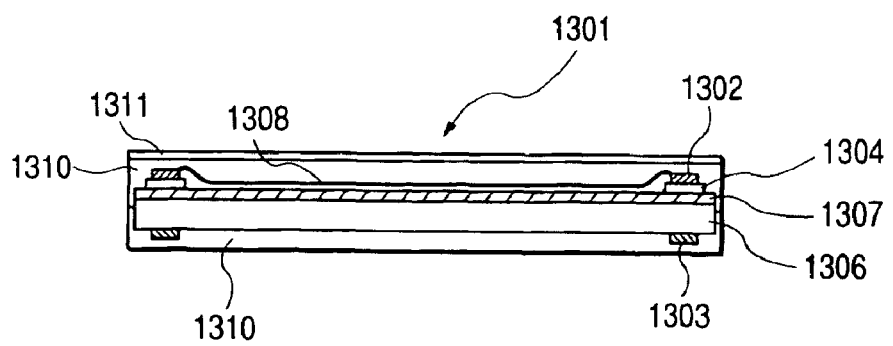
FIG. 14B is a cross-sectional view taken in the line 14B—14B of FIG. 14A.

FIGS. 14A and 14B are schematic views of the solar cell module for use in the present example. FIG. 14A is a plan view of the solar cell module, and FIG. 14B is a sectional view taken in the line 14B—14B of FIG. 14A.

A solar cell module 1301 has a semiconductor photoactive layer 1307 formed on a metal substrate 1306, which is also a back electrode, and a collecting electrode 1305 for collecting the current generated in the semiconductor photoactive layer 1307 is disposed on the side of a light-receiving surface. A stainless steel having a thickness of 0.15 mm is used for the metal substrate 1306; tandem construction consisting of amorphous silicon and microcrystalline silicon is used for the semiconductor photoactive layer 1307; and for the collecting electrode 1305, a copper wire of 100 $\mu$m$\phi$ is fixed on the semiconductor photoactive layer 1307 with a conductive paste.

Further, the collecting electrode 1305 is connected to a copper positive electrode tab 1302 of 100 $\mu$m thick. In addition, a polyester insulating member 1304 is disposed to insure the insulation between the positive electrode tab 1302 and the metal substrate 1306.

Furthermore, for providing weather resistance, an acryl-silicone weatherproof coating 1308 was formed on the collecting electrode 1305.

For carrying out a series-parallel work for the solar cell module easily in the field, a bare copper solid wire 1309 of φ1.6 mm is processed to an almost U shape to be electrically connected with the positive electrode tab 1302 and the negative electrode tab 1303 by unleaded solder in advance.

In addition, the light-receiving surface and a non-light-receiving surface of the solar cell module were sealed with a laminate of an ETFE resin 1311 and an EVA resin 1310 and with an EVA resin 1310 of 460 μm thick, respectively, by a vacuum laminator to manufacture a solar cell module.

The solar cell module of the present example comprises the metal substrate 1306 having a dimension of 240 mm×360 mm and the coating material (EVA resin 1310) having a dimension of 260 mm×370 mm. Further, the present solar cell module has an Ipm of 9.21 A.

(Plate-Shaped Member, Support Member)

These members are the same as those of Example 1, so that description will be omitted.

(Construction Method)

The procedure for manufacturing the concrete mounting structure with the solar cell module of the present example using the above-described materials will now be described.

(Determination of the Series-Parallel Numbers of the Solar Cell Modules)

In the present example, 40 solar cell modules were connected in series, and four set of the 40-series-connected solar cell modules were connected in parallel to prepare one solar cell module-mounting structure aggregate.

(Determination of the Inclination Angle of the Plate-Shaped Member, Positioning and Arrangement (Method for Applying an Adhesive))

In the present example, the inclination angle of the plate-shaped member was set at 25°. The point at 34.74° north latitude and 135.80° east longitude was selected for the location of the installation. The distance between racks, under the conditions that the loss of the generated energy of a solar cell module relative to the annual generated energy is below 1%, was calculated to be 266 mm from the annual solar radiation data of the location.

In the present example, since three plate-shaped members are used for two solar cell modules, similar to Example 1, the number of the plate-shaped members required was 240 from the calculation as follows: 40 in series÷2×3=60, which 60 are required for four rows. Further, the support members of 240 pieces were used, which is the same number as the plate-shaped members as shown in FIG. 13.

In the present example, as the inclination angle is larger than 16° of Example 1, the direction for installing the support member 1203 is the same as the direction of the plate-shaped member 1202 as shown in FIG. 13. The distance between racks (distance shown by numeral 1206 in FIG. 13) of the present example is about 315 mm, maintaining a sufficiently necessary distance between racks, since the support member 1203 was arranged in the same direction as that of the plate-shaped member 1202.

The sequence for installing the support member 1203 and the plate-shaped member 1202 is the same as Example 1, so that the description will be omitted.

(Sticking of a Solar Cell Module, a Sticking Position and the Sequence for Sticking)

Next, a solar cell module was stuck on an installed plate-shaped member with an elastic adhesive. The adhesive was not applied on the whole back surface EVA of the solar cell module, but its suitable amount was applied on five points including four corners and the center, and pressed to be stuck to the plate-shaped member.

When sticking, a primer (undercoat agent) was applied to improve the EVA surface, on which the elastic adhesive was applied.

The sequence for sticking the solar cell module is similar to that in Example 1.

(Series-Parallel Connection Work between Solar Cell Modules)

The description will be omitted as the work is similar to that in Example 1.

(Connection of Bypass Diode)

The description will be omitted as the work is similar to that in Example 1.

EXAMPLE 3

Figure 15:
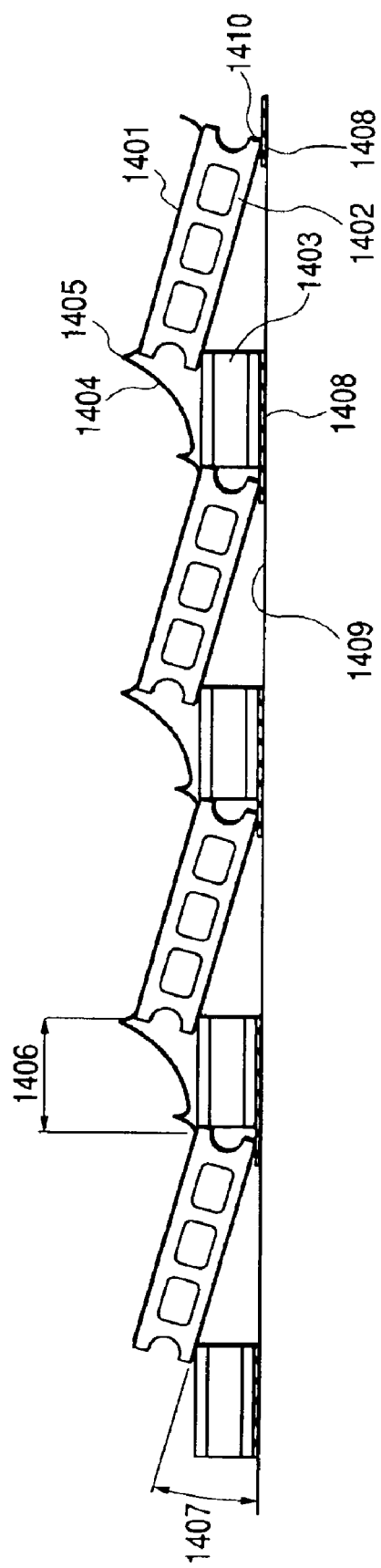
FIG. 15 is a side view schematically showing a part of the solar cell module-mounting structure of Example 3.

In the present example, the surface for installing a plate-shaped member was a concrete surface. FIG. 15 is a side view of the solar cell module-mounting structure of the present example. In FIG. 15, numeral 1401 denotes a solar cell module; 1402 denotes a plate-shaped member; 1403 denotes a support member; 1404 denotes a connection cable; 1405 denotes a connection member (ring sleeve); 1406 denotes the distance between racks; 1407 denotes the inclination angle of the plate-shaped member; 1408 denotes an insulating member; and 1409 denotes a concrete surface which is a plate-shaped member installing-surface.

In the present example, a rubber 1408, which is an insulating member having a thickness of 5 mm and a width of 50 mm, was placed between the side 1410 of the plate-shaped member 1402 to be brought into contact with the concrete surface 1409, and the concrete surface 1409 and between the support member 1403 and the concrete surface 1409, in order to further reduce the leak current to the non-insulation cable way of the solar cell module and to the concrete surface 1409, in addition to the state of Example 1. The rubber material includes silicon, EPDM and the like.

By placing the insulation member 1408 such as a rubber material, when the concrete surface 1409 is wet by a rain fall, friction strength may be reduced compared with the case in which the plate-shaped member 1402 is in direct contact with the concrete surface 1409, and the possibility of lateral movement of the plate-shaped member 1402 may be increased.

This is the phenomenon that the friction strength between the insulation member such as a rubber and the concrete becomes smaller than that between the plate-shaped member and the insulation member, and the strength required for the lateral movement is reduced compared with the case in which the plate-shaped member is in direct contact with the concrete installation surface.

On the other hand, like the present invention, the upper part of the solar cell module-fixing surface of the plate-shaped member 1402 in a certain row can be placed so as to abut against the support member 1403 in the next adjacent row to effectively prevent the above-described lateral movement.

EXAMPLE 4

Figure 16:
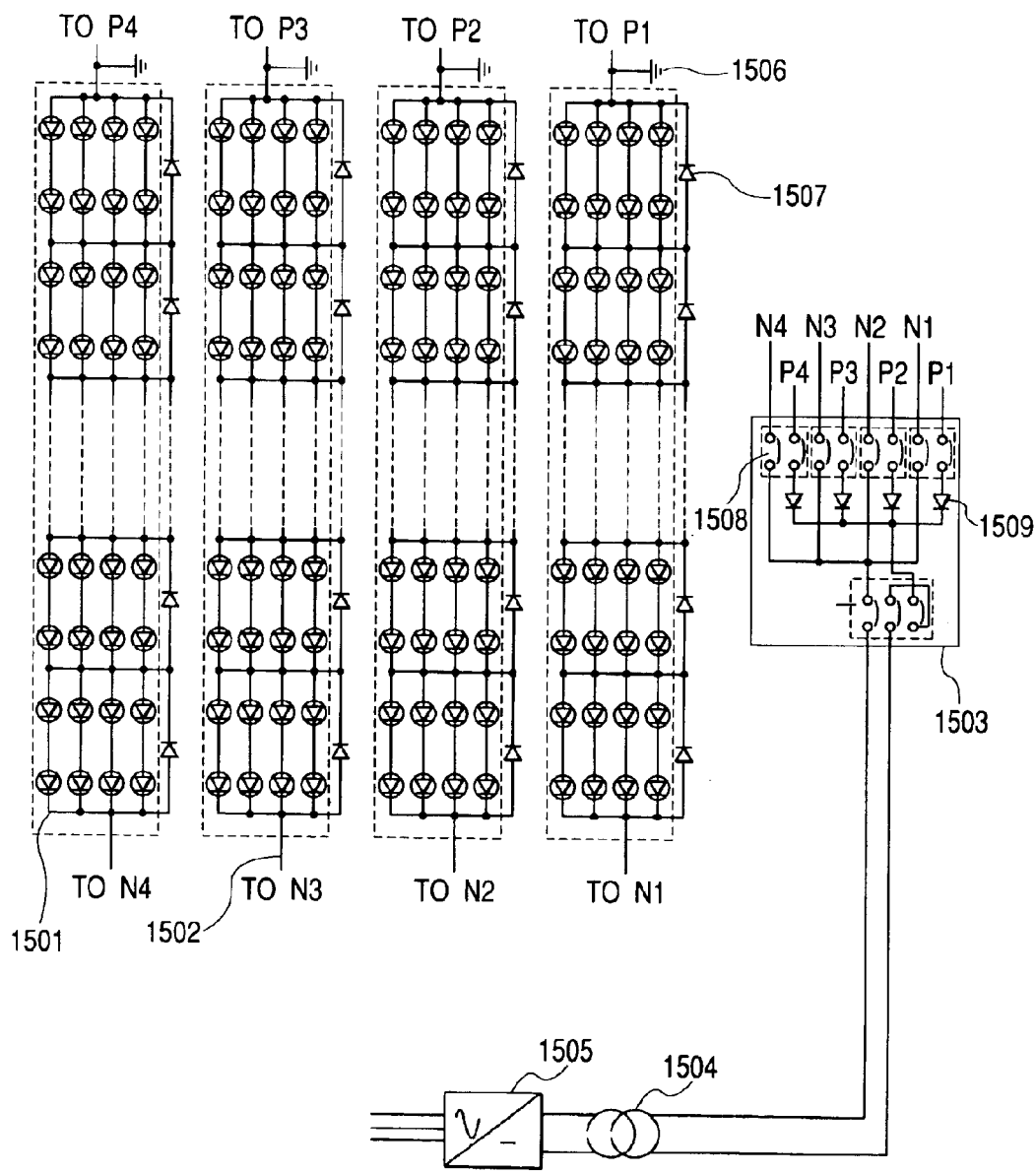
FIG. 16 is a schematic diagram of the photovoltaic power generation system of Example 4.

This is the example in which the solar cell module-mounting structures of Example 1 (40 in series and 4 in parallel) are used to construct a photovoltaic power generation system. FIG. 16 is a schematic view of the solar cell module array of the present example. In the present example, four sets of the solar cell module-mounting structures of Example 1 are used to be connected in parallel in a connection box.

In FIG. 16, numeral 1501 denotes a solar cell module-mounting structure; 1502 denotes a wire; 1503 denotes a connection box (pedestal box); 1504 denotes an isolation transformer; 1505 denotes a power conditioner; 1506 denotes a ground point; 1507 denotes a bypass diode; 1508 denotes a switch; and 1509 denotes a blocking diode.

Wiring as shown in FIG. 16 allows the photovoltaic power generation system to be constructed using the solar cell module-mounting structure according to the present invention. In the present system, the electric power generated at the solar cell module-mounting structure 1501 is combined in the connection box 1503 to be converted from direct current to alternate current by the power conditioner 1505 and used for electric power.

In the present system, the end of the positive electrode was grounded to make the voltage to ground of the solar cell module to negative, thereby giving cathode corrosion protection.

INDUSTRIAL APPLICABILITY

According to the present invention, a simple mounting structure of a solar cell module rack can effectively prevent lateral movement of a plate-shaped member by a wind load to prevent the break of a wire and the like caused by such lateral movement.

Further, use of a concrete member for the plate-shaped member can suppress cost increase of the rack as much as possible, and in particular use of lightweight hollow concrete can improve installation workability and easiness of construction, resulting in cost reduction.

In addition, the plate-shaped member can be abutted against a support member to be placed on an installation surface. Therefore, when only the support member and the plate-shaped member to be installed first are positioned properly, subsequent installation can be performed only by abutting the plate-shaped member against the support member, allowing the time for a cumbersome positioning work to be shortened.

Furthermore, use of an adhesive for fixing the solar cell module on the surface of the plate-shaped member eliminates concern for stripping of the solar cell module by a wind load. In particular, use of an elastic adhesive or a double-sided tape with elasticity for fixing the solar cell module allows the adhesive layer to absorb difference in the coefficient of thermal expansion between the solar cell module and the plate-shaped member, thereby resulting in the improvement of reliability. In addition, the solar cell module is fixed to the plate-shaped member at the surrounding part (circumferential edge), thereby allowing easy replacement of the solar cell module.

In addition, placement of an insulating member between one end of the plate-shaped member to be brought into contact with an installation surface and the installation surface can further reduce the leak current from the insufficiently insulated part when using a solar cell module having a partly exposed cable way or a wire having no insulation coating, thereby allowing construction of a solar cell module-mounting structure, a solar cell module array and a photovoltaic power generation system having extremely high efficiency and reliability.

What is claimed is:

1. A solar cell module-mounting structure comprising:

a plate-shaped member having a solar cell module fixed on one surface thereof, said plate-shaped member being placed on an installation surface;

a first support member; and a second support member, wherein a surface of said plate-shaped member opposite to the solar cell module-fixing surface is in contact with said first support member, and wherein a side surface of said plate-shaped member disposed between the solar cell module-fixing surface and the surface opposite thereto has an edge in direct contact with the installation surface and has a part in direct contact with said second support member.

2. The solar cell module-mounting structure according to claim 1, wherein said second support member is a support member in direct contact with a surface of a second plate-shaped member opposite to a solar cell module-fixing surface of said second plate-shaped member to support said second plate-shaped member.

3. The solar cell module-mounting structure according to claim 1, wherein said plate-shaped member is cast from a concrete material.

4. The solar cell module-mounting structure according to claim 1, wherein said plate-shaped member, said first support member, and said second support member have the same shape and are made of the same material.

5. The solar cell module-mounting structure according to claim 1, wherein said solar cell module is fixed to said plate-shaped member with an adhesive.

6. The solar cell module-mounting structure according to claim 5, wherein said adhesive is an elastic adhesive.

7. The solar cell module-mounting structure according to claim 5, wherein said adhesive is provided at a surrounding part of said solar cell module.

8. The solar cell module-mounting structure according to claim 1, wherein said solar cell module is composed of amorphous silicon formed on a stainless steel substrate.

9. The solar cell module-mounting structure according to claim 1, wherein said installation surface comprises an insulating member, and wherein said edge of said side surface is in direct contact with said insulating member.

10. A solar cell module array comprising the solar cell module-mounting structure according to claim 1.

11. A photovoltaic power generation system comprising a solar cell module array according to claim 10 and a power conditioner.

* * * * *